(12) United States Patent
Simpson et al.

(10) Patent No.: US 7,996,492 B2
(45) Date of Patent: Aug. 9, 2011

(54) SYSTEM FOR PROVIDING INFORMATION REGARDING NETWORK RESOURCES

(75) Inventors: Shell S. Simpson, Boise, ID (US); Ward S. Foster, Boise, ID (US); Kris R. Livingston, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2179 days.

(21) Appl. No.: 10/081,484

(22) Filed: Feb. 20, 2002

(65) Prior Publication Data
US 2003/0158912 A1    Aug. 21, 2003

(51) Int. Cl.
*G06F 15/16* (2006.01)
(52) U.S. Cl. .................. 709/218; 358/1.15; 715/738
(58) Field of Classification Search .................. 709/231, 709/223, 216, 202, 229, 220, 219, 218, 246; 358/1.15, 1.13; 345/814; 705/26; 399/8; 714/39; 707/9, 104.1, 102, 3; 713/200; 718/102; 715/738
See application file for complete search history.

(56) References Cited

U.S. PATENT DOCUMENTS

| | | | | |
|---|---|---|---|---|
| 5,982,996 | A * | 11/1999 | Snyders ...................... | 358/1.15 |
| 6,184,996 | B1 * | 2/2001 | Gase .......................... | 358/1.15 |
| 6,260,044 | B1 * | 7/2001 | Nagral et al. ................ | 707/102 |
| 6,453,127 | B2 * | 9/2002 | Wood et al. .................. | 399/8 |
| 6,496,859 | B2 * | 12/2002 | Roy et al. .................... | 709/223 |
| 6,829,060 | B2 * | 12/2004 | Simpson et al. ............. | 358/1.15 |
| 6,832,263 | B2 * | 12/2004 | Polizzi et al. ................ | 709/246 |
| 6,847,466 | B1 * | 1/2005 | Gazdik et al. ............... | 358/1.15 |
| 6,856,415 | B1 * | 2/2005 | Simchik et al. ............. | 358/1.15 |
| 6,910,077 | B2 * | 6/2005 | Najork ........................ | 709/229 |
| 6,961,936 | B2 * | 11/2005 | Bhatti ......................... | 718/102 |
| 7,012,706 | B1 * | 3/2006 | Hansen ....................... | 358/1.15 |
| 7,143,109 | B2 * | 11/2006 | Nagral et al. ............... | 707/104.1 |
| 2002/0016921 | A1 * | 2/2002 | Olsen et al. ................. | 713/200 |
| 2002/0069239 | A1 * | 6/2002 | Katada et al. ............... | 709/202 |
| 2002/0075321 | A1 * | 6/2002 | Sakatani ..................... | 345/814 |
| 2002/0101600 | A1 * | 8/2002 | Sabbagh et al. ............ | 358/1.13 |
| 2002/0113995 | A1 * | 8/2002 | Evans et al. ................ | 358/1.15 |
| 2002/0152210 | A1 * | 10/2002 | Johnson et al. ............. | 707/9 |
| 2003/0009537 | A1 * | 1/2003 | Wang .......................... | 709/219 |
| 2003/0053102 | A1 * | 3/2003 | Kelsey ........................ | 358/1.13 |
| 2003/0076526 | A1 * | 4/2003 | Gopalan ..................... | 358/1.15 |
| 2003/0083952 | A1 * | 5/2003 | Simpson et al. ............ | 705/26 |
| 2003/0084114 | A1 * | 5/2003 | Simpson et al. ............ | 709/216 |
| 2003/0084178 | A1 * | 5/2003 | Simpson et al. ............ | 709/231 |
| 2003/0101242 | A1 * | 5/2003 | Cowden et al. ............. | 709/220 |
| 2003/0191988 | A1 * | 10/2003 | Dalal et al. ................. | 714/39 |
| 2005/0234873 | A1 * | 10/2005 | Milligan et al. ............ | 707/3 |

OTHER PUBLICATIONS

U.S. Appl. No. 09/712,336, filed Nov. 13, 2000, Simpson et al.

* cited by examiner

*Primary Examiner* — Jungwon Chang

(57) ABSTRACT

A client-server system is described. The system includes a group of Web sites that provide Web resources to clients. The resources can communicate with a common interface in order to access a user's documents when the user is actively making use of the resource. The system further includes a Web site that can deliver a Web page to a client. The Web page provides links and other information regarding the group of Web sites.

21 Claims, 17 Drawing Sheets

SYSTEM FOR PROVIDING INFORMATION REGARDING NETWORK RESOURCES

BACKGROUND

A client-server system generally refers to an architectural model that defines the role that two or more computing devices will play when they communicate with one another. Typically, a server is used to provide the client with a resource and/or perform some sort of service for the client.

Servers connected to the Internet, for example, offer an extraordinarily wide range of resources that is growing year by year. For example, some Web sites provide an informational type resource by serving Web pages and/or by allowing a client to search and retrieve items from a database. Other Web Sites provide transactional resources. For example, some vendor Web sites allow a user to browse a catalogue of items and to make online purchases from the catalogue. See, for example, the patent entitled "INTERNET-BASED CUSTOMER REFERRAL SYSTEM", having U.S. Pat. No. 6,029,141.

The client-server system has proven to be very successful and useful in providing a client with a wide range of network resources. What is needed, however, are ways that can extend the capabilities of these systems.

SUMMARY

According to one embodiment, the invention provides a Web Server computer. The Web Server computer includes apparatus for receiving a request from a client computer over a network and apparatus for responding to the request by sending the client computer at least one Web page. The at least one Web page may include a plurality of hyperlinks to a plurality of different Web sites, each Web site providing a Web resource configured to communicate through common interface in order to access a user's job document when the user is actively making use of the resource.

DESCRIPTION

Figure 1:
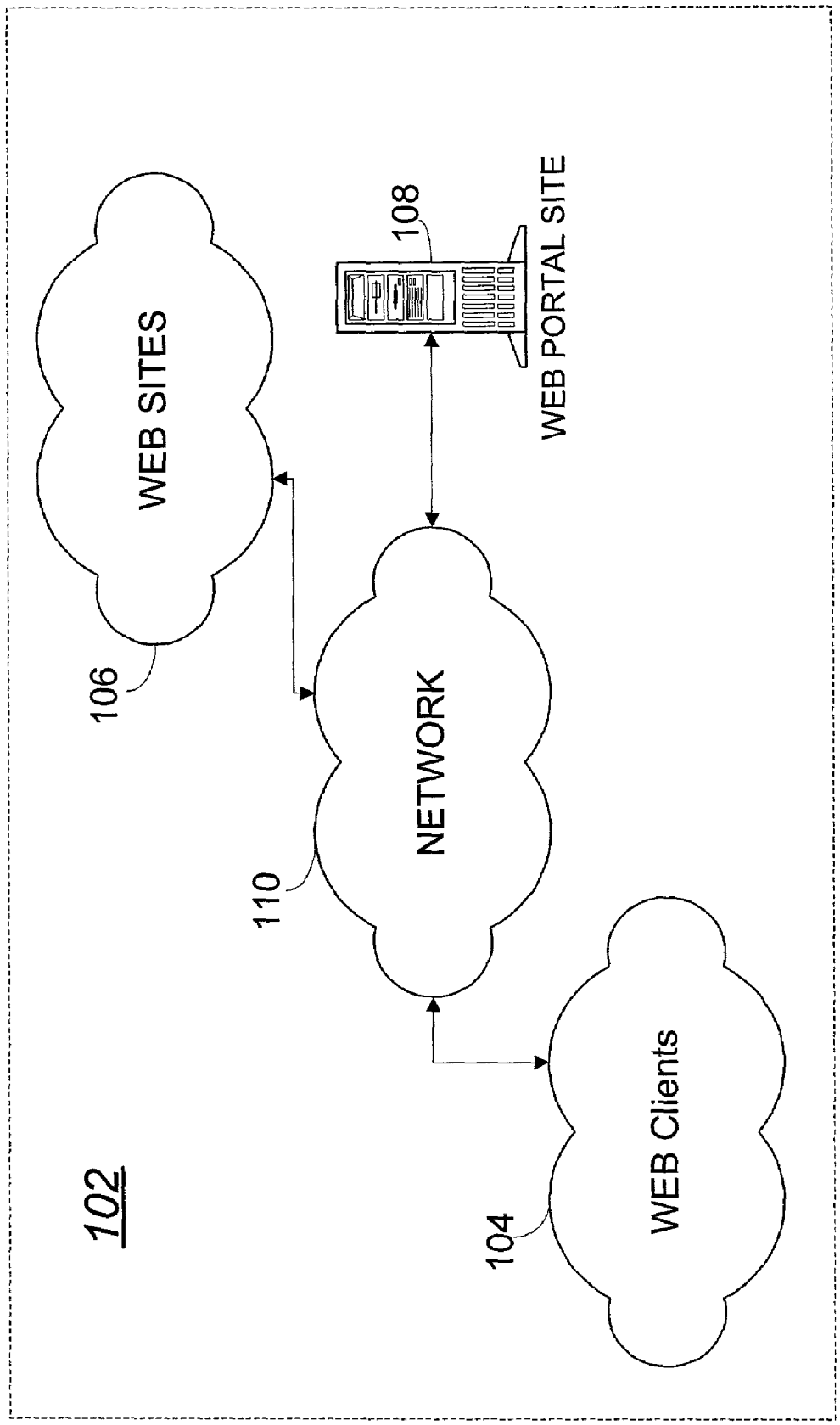
FIG. 1 depicts one embodiment of the invention in the form of a computing system.

FIG. 1 depicts one embodiment of the invention in the form of a computing system 102. The computing system 102 includes a group of Web client computers 104, a group of Web sites 106 and a Web site (Web portal site) 108 all connected to a network 110.

The network 110 can be, for example a local area network (LAN), a series of networks, a wide area network (WAN), etc. In the following discussion and for illustration purposes, however, the network 110 is assumed to represent the Public Internet.

Figure 2A:
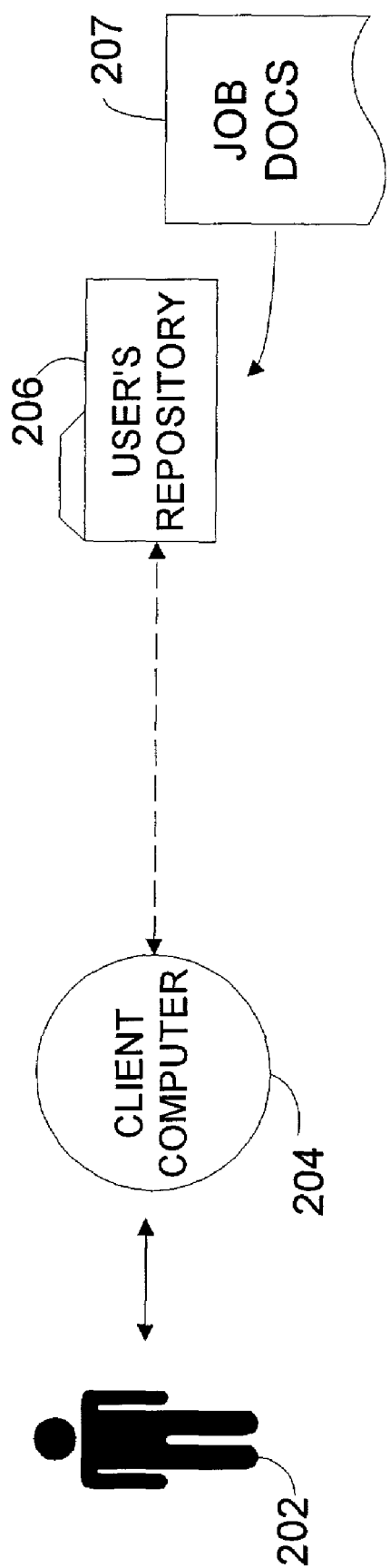
FIG. 2A and FIG. 2B illustrates, conceptually, certain aspects of the ECS model in the present embodiment.
Figure 2B:
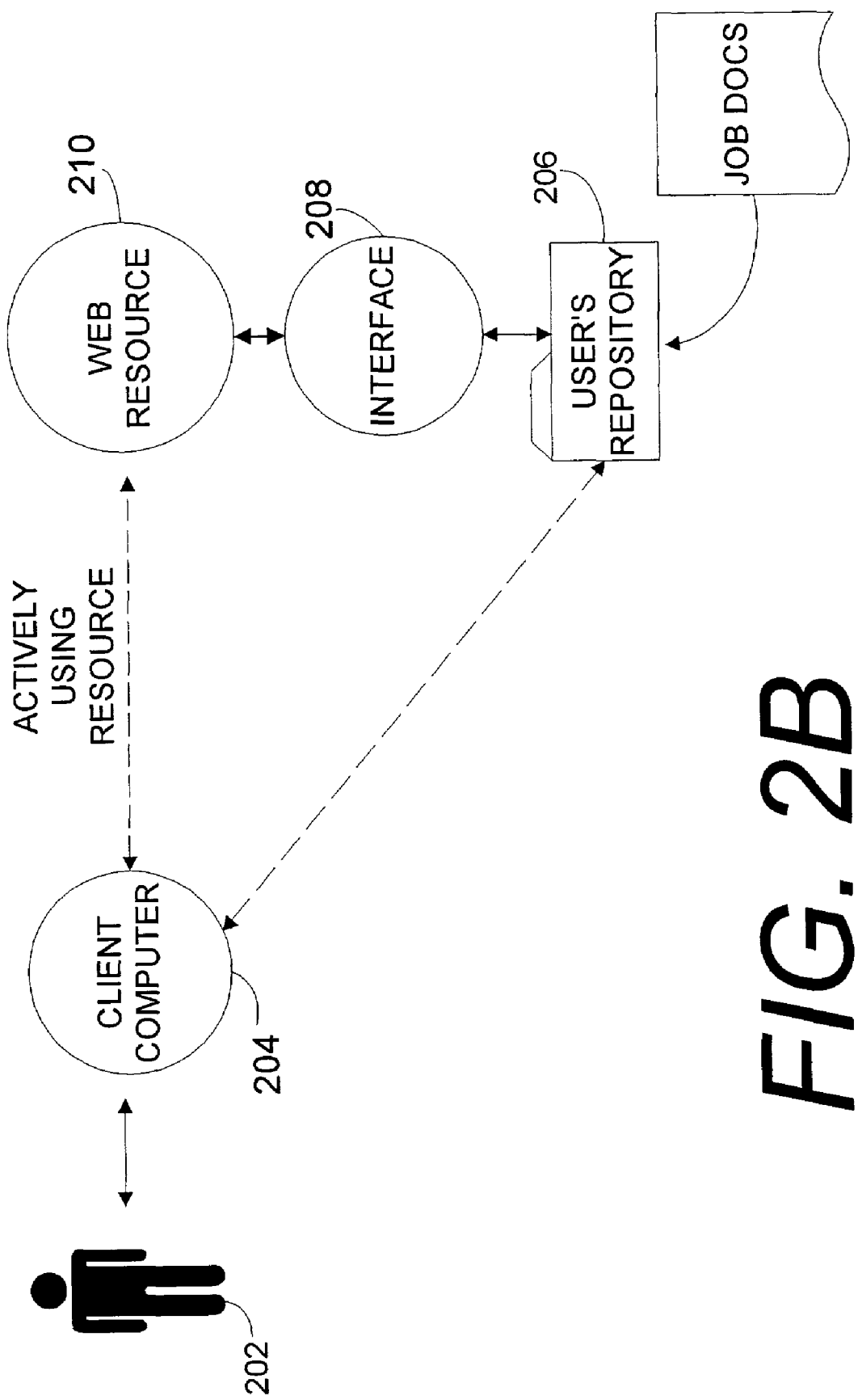

It is noted for the later discussion that the group of Web client computers 104 and the group of Web sites 106 comply with an extended client-server architectural model (ECS model). FIG. 2A and FIG. 2B illustrates, conceptually, certain aspects of the ECS model used in the present embodiment.

ECS Repository

Referring now to FIG. 2A, in accordance with the ECS model, a user 202 of a Web client computer 204 is provided his/her own special repository for storing electronic documents. For ease of discussion, this special repository may be referred to herein as the user's personal "ECS" repository. The documents that classify as being stored in the user's personal "ECS" repository may be referred to herein as the user's "job documents". It is noted that a user's personal ECS repository may be a logical location. The physical location of the user's job documents may be (but not necessarily) dispersed throughout the computer system 102.

As shown, in this example, the user 202 has several job documents 207 that classify as being stored in his/her personal ECS repository 206. The user 202 can access (i.e., add documents, delete documents, edit documents, etc) his/her personal ECS repository 206 by interacting with the Web client computer 204. In some embodiments, the user 202's personal ECS repository 206 is presented to the user in the form of a special electronic folder that exists on the desktop of the client computer 204. The user 202 can "create a job document" by "storing" a document into this folder. The user 202 can also designate which document in this folder is to be his/her "target job document" (see below).

Job Document

As discussed above, an electronic document that classifies as being stored in a user's personal ECS repository may be referred to herein as the user's "job document". It is noted that, in the present embodiment, a super classification of job document exists. A job document stored in a user's personal ECS repository that falls into this classification may be referred to herein as the user's "target job document". In the present embodiment, it has been pre-determined that only one job document in a user's personal ECS repository can be a "target job document". In alternative embodiments, however, more than one document in a user's personal ECS repository may be classified as a "target document". In still other embodiments, this super classification does not exist.

Common Interface

Referring now to FIG. 2B, the ECS model further provides for a common interface to a user's personal ECS repository. For ease of discussion, this interface may generally be referred to herein as the "ECS Interface".

In general, the ECS Interface provides a mechanism for enabling a Web resource to access the user's personal ECS repository when the user is actively using the resource.

Thus, for example, in FIG. 2B the user 202 is presently making use of a Web resource 210. The Web resource 210 is delivered (via the network 110) to the client computer 204 from a Web site using an http protocol (or other suitable protocol).

While the user 202 is making use of the Web resource 210, the Web resource 210 communicates with the interface 208 in order to "access" the user's personal ECS repository 206. The interface 208 operates to link the Web resource 210 to the users 202's personal ECS repository 206. The Web resource 210, therefore, need not provide the interface 208 with the location of the user's job documents. As will be discussed in greater detail below, one way to implement the interface 202 is in the form of a Web extension that provides an application program interface (API).

It is noted that the term "access" is used broadly in this application. The Web resource 210, for example, "accesses" the user 202's personal ECS repository 206 if the Web resource 210:

(a) adds a document to the repository 206;

(b) deletes a document that already exists in the repository 206; or (c) edits a document that already exists in the repository 206.

For ease of discussion, a Web resource configured to make use of an ECS interface (as implemented in the present embodiment) may be referred to herein as an "ECS resource". A Web Site that provides an ECS resource may be referred to herein as an "ECS Web site". Each of the Web sites from the group of Web sites 106 is an "ECS Web site".

In the present embodiment, a user's personal ECS repository, as well as the ECS interface that provides access to that repository, can be implemented on the client computer that the user operates. The following discussion illustrates.

Figure 3:
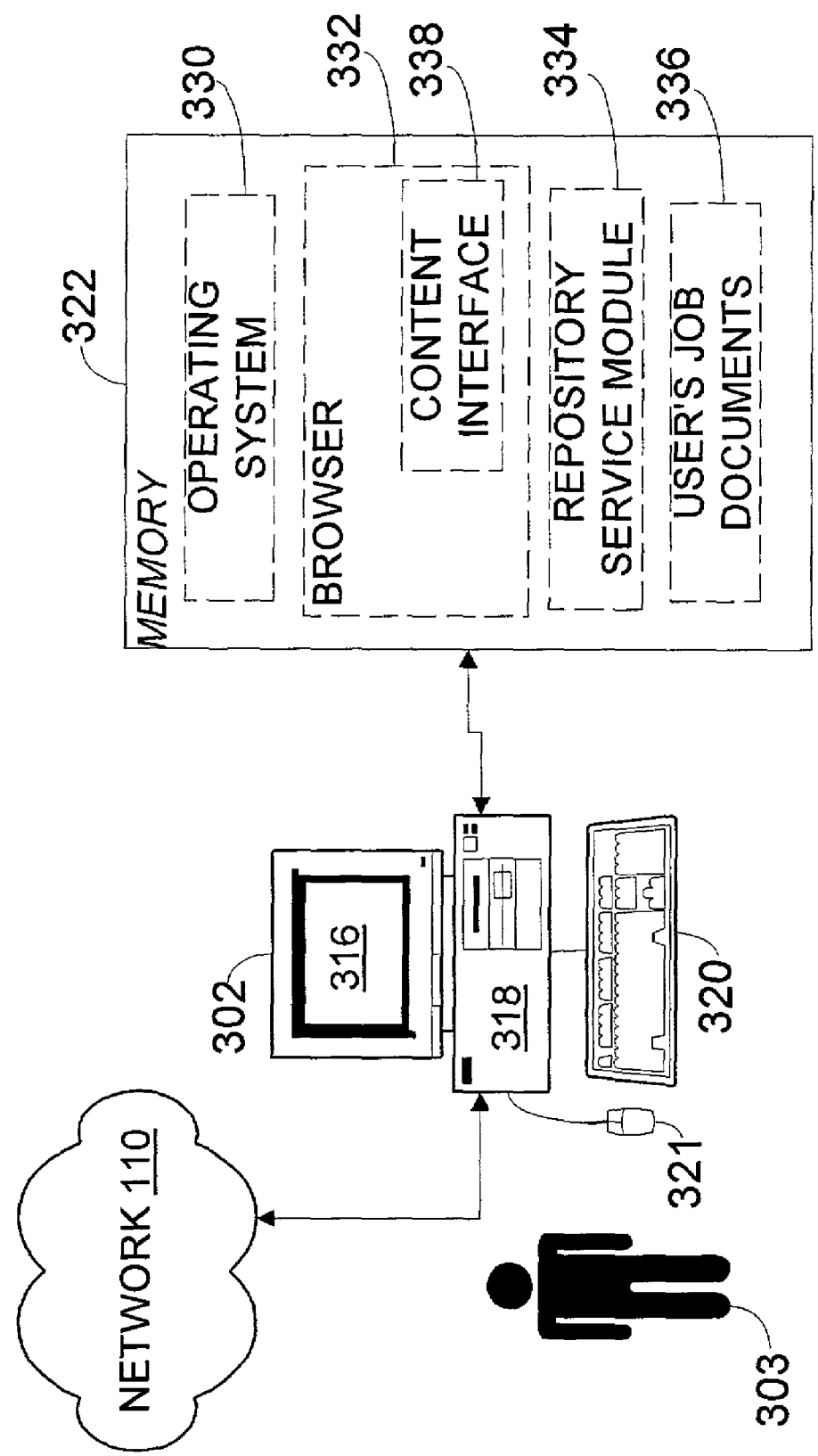
FIG. 3 illustrates a typical client computer in the computing system.

FIG. 3 illustrates a typical client computer 302 from the group of Web client computers 104. In this example, the client computer 302 is a personal computer and is typically operated by a user 303. As shown, the client computer includes a display monitor 316, a processing unit 318, a keyboard 320, a mouse 321 and a memory 322.

The memory 322 is shown external to the processing unit 318 in order to illustrate the software components and data stored therein. It is noted, however, that portions of (or the entire memory 322) may in fact reside internal to the processing unit 318.

As shown, stored in the memory 322 is a local operating system (OS) 330, a Web Browser 332, a "repository service module" 334 and a set of the job documents 336.

As will be discussed in greater detail below, the job documents 336 are those documents that classify as being in the user 303's personal ECS repository. Thus, the job documents 336 are the user 303's job documents.

The client computer 104 runs the OS 330. In order for a new user to access the client computer 302, a local user account is established for him/her by following a process that is dictated by the requirements of the local OS 330. The user's local account includes a user name and a password that is assigned to the user. Once a local user account is established for the user, the user can then access the client computer 302 by logging on. Logging on to the client computer 302 involves the user inputting his/her assigned user name and password. This process serves to establish the user's online identity. For ease of discussion, a user presently logged into the client computer 302 may be referred to herein as the "active user".

In the following discussion, it is assumed that the user 303 has a user account on the client computer 302 and can therefore login to the client computer 302.

RS Module

The repository service module (RS) module 334 can provide each user of the client computer 302 with their own personal ECS repository. The RS module 334 performs this function, in part, by maintaining up to date data that identifies the physical location of those documents that classify as being "in" each user's personal ECS repository.

As previously indicated, the user's job documents may be remotely located with respect to the client computer 302. In the present embodiment, however, it is assumed that the user 303's job documents 336 are stored locally in the memory 322.

The RS module 334 maintains data that both identify the physical location of each of the job documents 336 and the fact that these documents classify as being "in" the user 303's personal ECS repository. Additionally, the RS module 334 maintains data that identifies the document from the group of job documents 336 that classifies as the user 303's "target job document".

Web Browser

In general, the Web Browser 332 enables the Web Computer 302 to run Web content and to function as a Web client in the computing system 102. As used herein, the phrase "Web content" refers to a program of computer readable instructions that may be executed by a Web browser. Thus, for example, Web content may be a program of instructions written in any of the following languages (the following is a non-exhaustive list): HTML, JAVA, JAVA-SCRIPT, C-SHARP code, etc, or any combination thereof.

The Web browser 332 includes an extension that is designated "content interface" 338. In the present embodiment, the content interface 338 in an example of an ECS interface described above.

The content interface 338 provides an application program interface (API) for Web content. More specifically, Web content running in the browser 332 can issue API calls to the content interface 338 in order to access the active user's ECS personal repository. As noted above, the "active user" is the user presently logged into the Web Client computer 302. It is also noted that the API call(s) to invoke the content interface 338 is device independent and is defined by a pre-determined standard.

In the present embodiment, therefore, an "ECS resource" refers to Web content that can issue one or more of these standard API calls in order to access a user's personal ECS repository. Furthermore, an "ECS Web site" refers to a Web site that can serve such Web content.

It can be seen from the forgoing that the content interface 338 provides a common interface for ECS Web resources. Furthermore, the content interface 338 enables an ECS Web resource to access the user's job documents while the user is actively using the resource.

Figure 4:
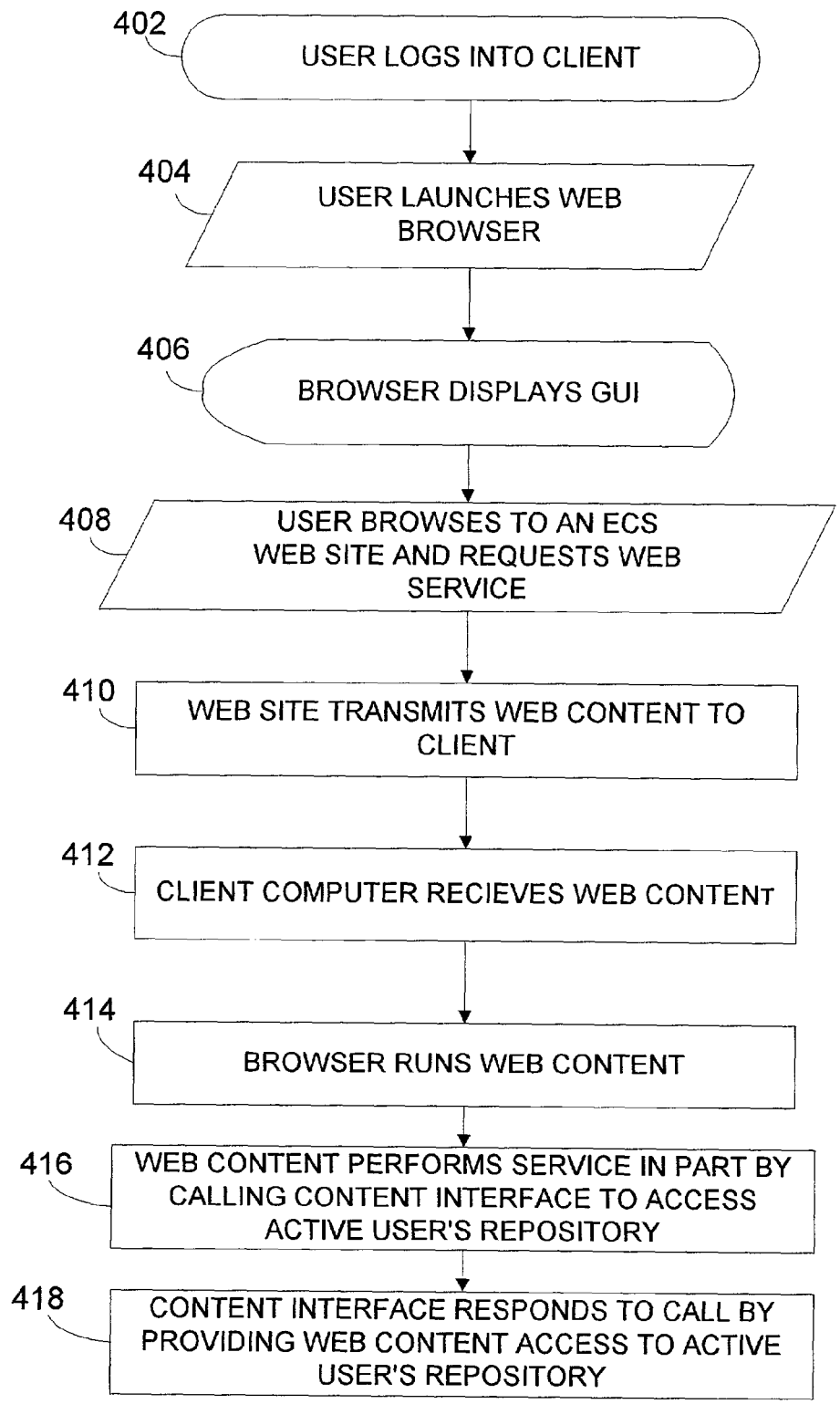
FIG. 4 is a flow chart illustrating, by way of example, the operation of a Web content interface.
Figure 5:
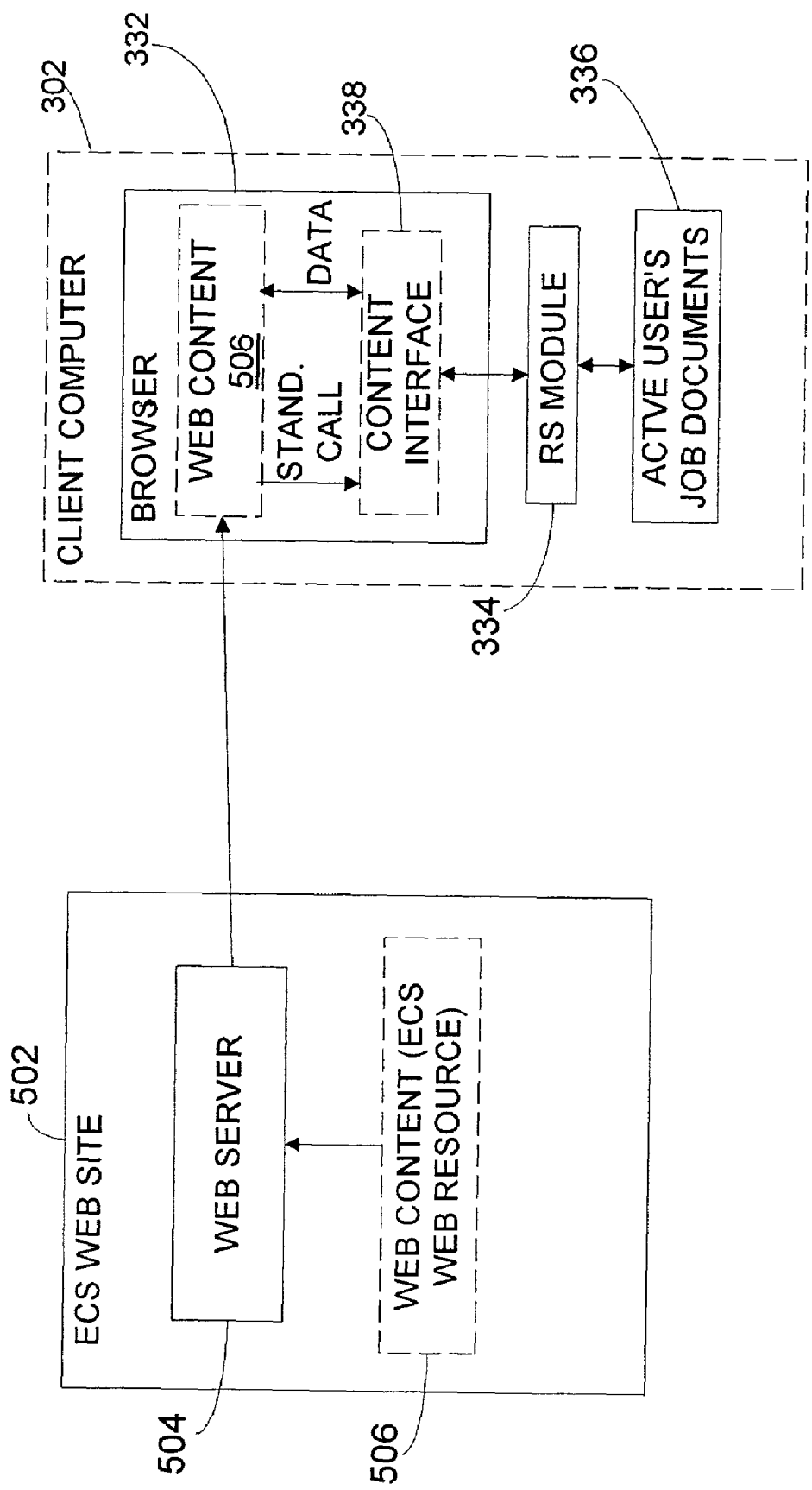
FIG. 5 is general software architectural block diagram illustrating certain aspects of the interaction between Web content and the interface.

FIG. 4 is a flow chart illustrating, by way of example, the operation of the content interface 338. FIG. 5 is a software architectural block diagram illustrating certain aspects of the interaction between Web content and the content interface 338.

Turning now to FIG. 4 and FIG. 5, the user 303 logs into the client computer 302 (step 402). Next, it is assumed that the user 303 launches the Web Browser 332 (step 404). Upon being launched, the Web Browser 332 displays an initial graphical user interface (Browser GUI) (step 406).

The user 303 then interacts with the Browser GUI in order to request an ECS Resource provided by an ECS Web Site 502

(step 408). The user may request access to this resource by inputting a URL (uniform resource locator) assigned to the resource. The Browser 332 responds to the user input by transmitting an appropriate request over the network 110 to a Web server 504 running in the ECS Web site 502.

In response to the request received from the browser 332, the Web Server 504 transmits the Web content 506 to the client computer 302 (step 410). The client computer 302 receives the Web content 506 (step 412) and the Browser 332 runs the Web content 506 (step 414). FIG. 5 shows the Web content 506 running in the Web Browser 332.

The Web content 506 (while running in the Browser 332) then proceeds to perform a service for the user 303. The Web content 506 performs the service in part by issuing an appropriate API call to the content interface 338 (step 416). The content interface 338 responds to the API call by providing the Web content 506 the requested access to the active user's ECS repository (step 418).

As indicated above, the user 303 is presently logged into the client computer 302 when the Web content 506 calls the content interface 338 at step 416. Thus, the content interface 338 performs step 418 by providing the Web content 506 appropriate access to the user 303's personal ECS repository.

FIG. 5 illustrates the Web content 506 calling the content interface 338 at step 416 and the response of the content interface 338 to these calls. The Web content may call the content interface 338 in order to, for example, edit, add, or remove documents from the active user's (i.e., the user 303's) personal ECS repository. As indicated in FIG. 5, the content interface 338 can operate cooperatively with the RS module 334 in order to respond appropriately to the call(s) issued by the Web content 506.

ECS Devices

In the present embodiment, an ECS Resource may provide a user with a client side interface to a network device that can create and/or process a user's job document. For ease of discussion, such an ECS resource may be referred to herein as "representing" the corresponding device. Additionally, a device that is "represented" by an ECS resource may generally be referred to herein as an "ECS device".

As just noted, an ECS device may be any device that allows a user to create and/or process a job document. Thus, for example, an ECS device may be a scanning device, a video camera, a printing device, etc.

Figure 6:
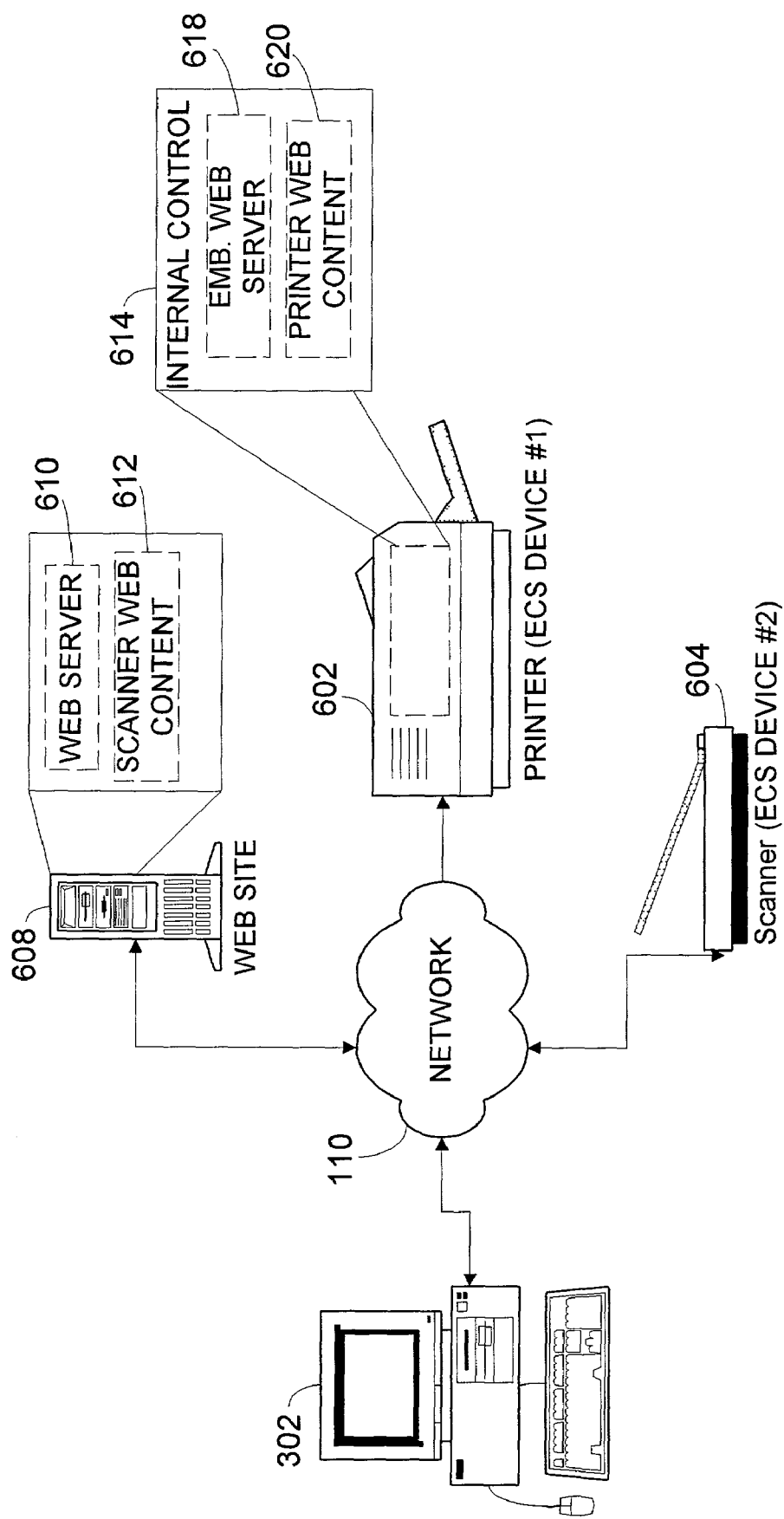
FIG. 6 illustrates two of the network devices in the system.

In the present embodiment, for example, the computing system 102 further includes various ECS devices. FIG. 6 illustrates two examples of an ECS device: a printer 602 and a scanner 604.

ECS Scanner Example

The ECS Resource representing the scanner 604, in this example, is provided by a Web site 608. The Web site 608 is from the group of Web sites 106. As shown, the Web site 608 runs a Web server 610 that can provide Web content (scanner Web content) 612 upon receiving an appropriate request from a Web client.

In general, the scanner Web content 612 enables a user to retrieve an electronic document stored in a local buffer of the scanner 604 and to place this document into his/her personal ECS repository. Thus, in this manner, the scanner Web content 612 enables a user to create a new job document.

Figure 7A:
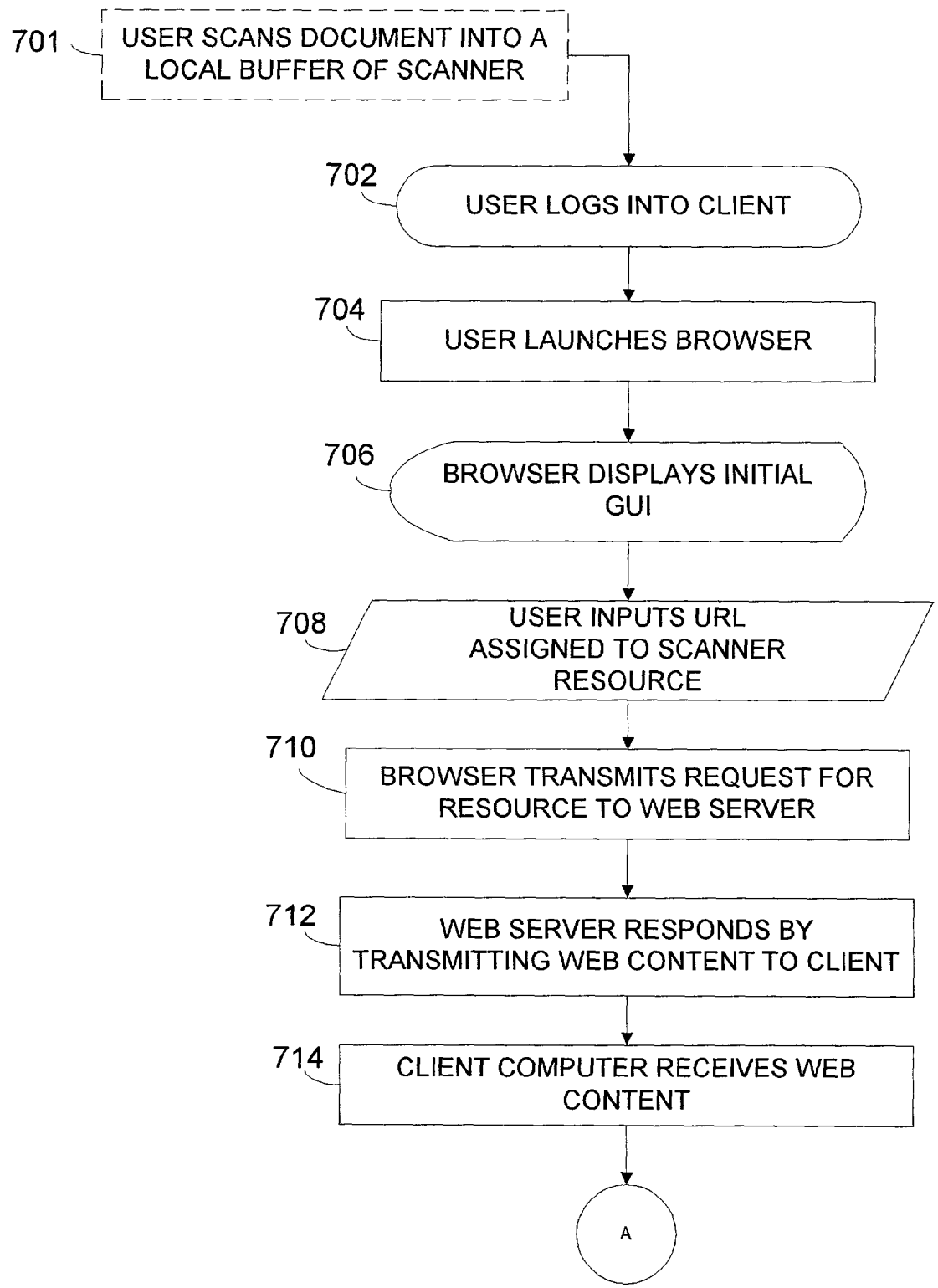
FIG. 7A and FIG. 7B is a flow diagram illustrating how a user can make use of a Web resource to create a new job document.
Figure 7B:
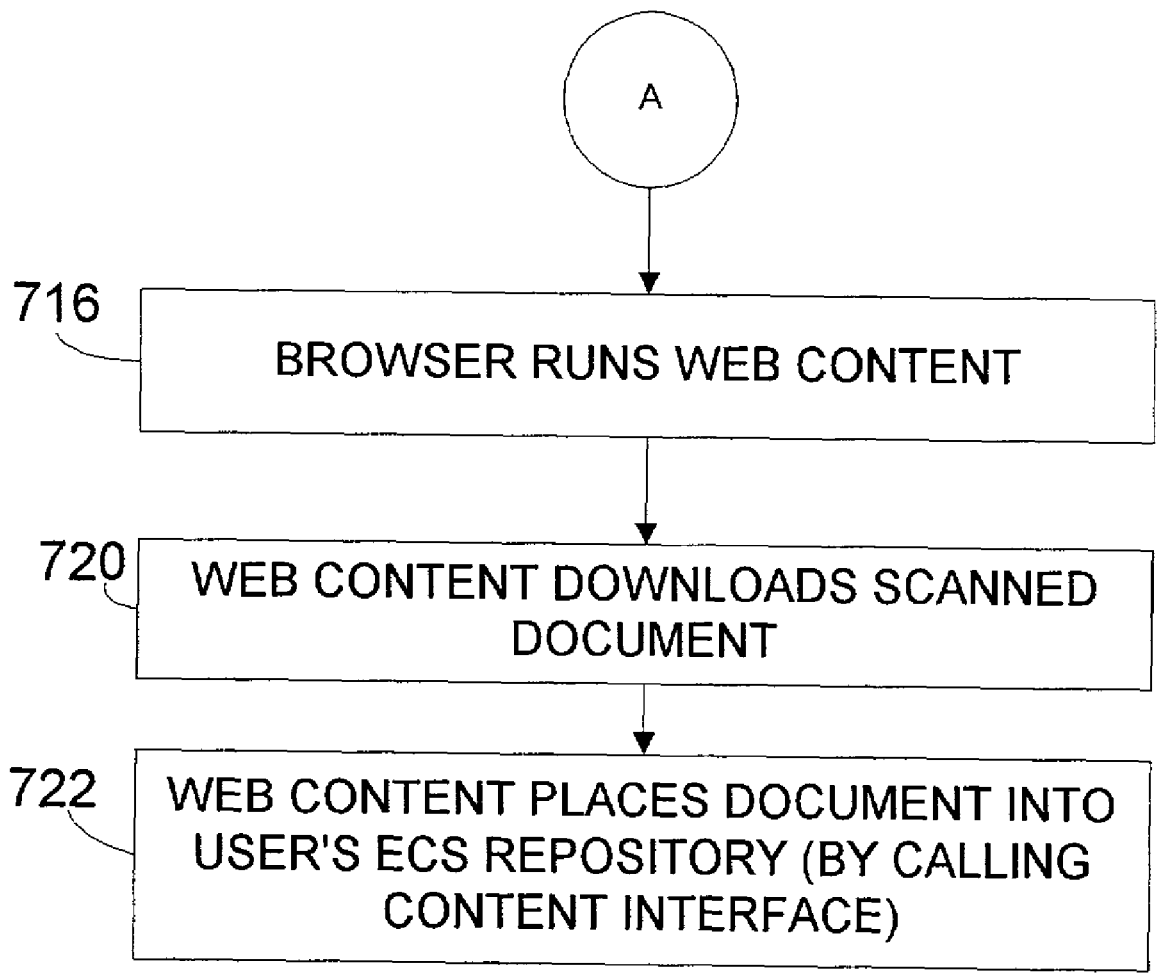

FIG. 7A and FIG. 7B is a flow diagram illustrating how the user 303 of the client computer 302, for example, can make use of the ECS Web content 612 in order to create a new job document.

Turning now to FIG. 7A, the user 303 is assumed to scan a hard copy document into the local buffer of the scanner 604 (step 701). Next, the user logs into the client computer 302 and launches the Web Browser 332 (Step 702 and step 704). The Browser 332, upon being launched, displays an initial graphical user interface (Browser GUI) at step 706.

Next, the user inputs a URL assigned to the ECS resource representing the scanner 604 (i.e., the scanner Web content 612) (step 708). In response to this user input, the Browser 332 transmits an appropriate request for this resource to the Web site 608 (step 710). The Web site 608 responds to the request by transmitting the scanner Web content 612 to the client computer 302 (step 712).

The client computer 302 receives the scanner Web content 612 and the Browser 332 runs the Web content 612 (step 714 and step 716). The Web content 612 (while running in the browser 332) operates to retrieve the scanned document from the local buffer of the scanner 604 (step 720) and proceeds to place this electronic document into the user 303's personal ECS repository (step 722).

It is pointed out to the reader that the scanner Web content 612 has created a new job document for the user 303 by performing step 722. Also, the Web content 612 performs step 722, in part, by issuing appropriate API calls to the content interface 338.

ECS Printer Example

The next ECS device example, the printer 602, will now be described. As shown, the printer 602 includes an internal control system 614, which, in this example, includes an embedded Web server 618. The Web server 618 can serve Web content (printer Web content) 620 to a client computer upon receiving an appropriate request from the client. The printer web content 620 is an ECS resource that represents the printer 602. In this example, the printer Web content 620 enables a client computer to print the user's "target job document" using the printer 604.

Figure 8:
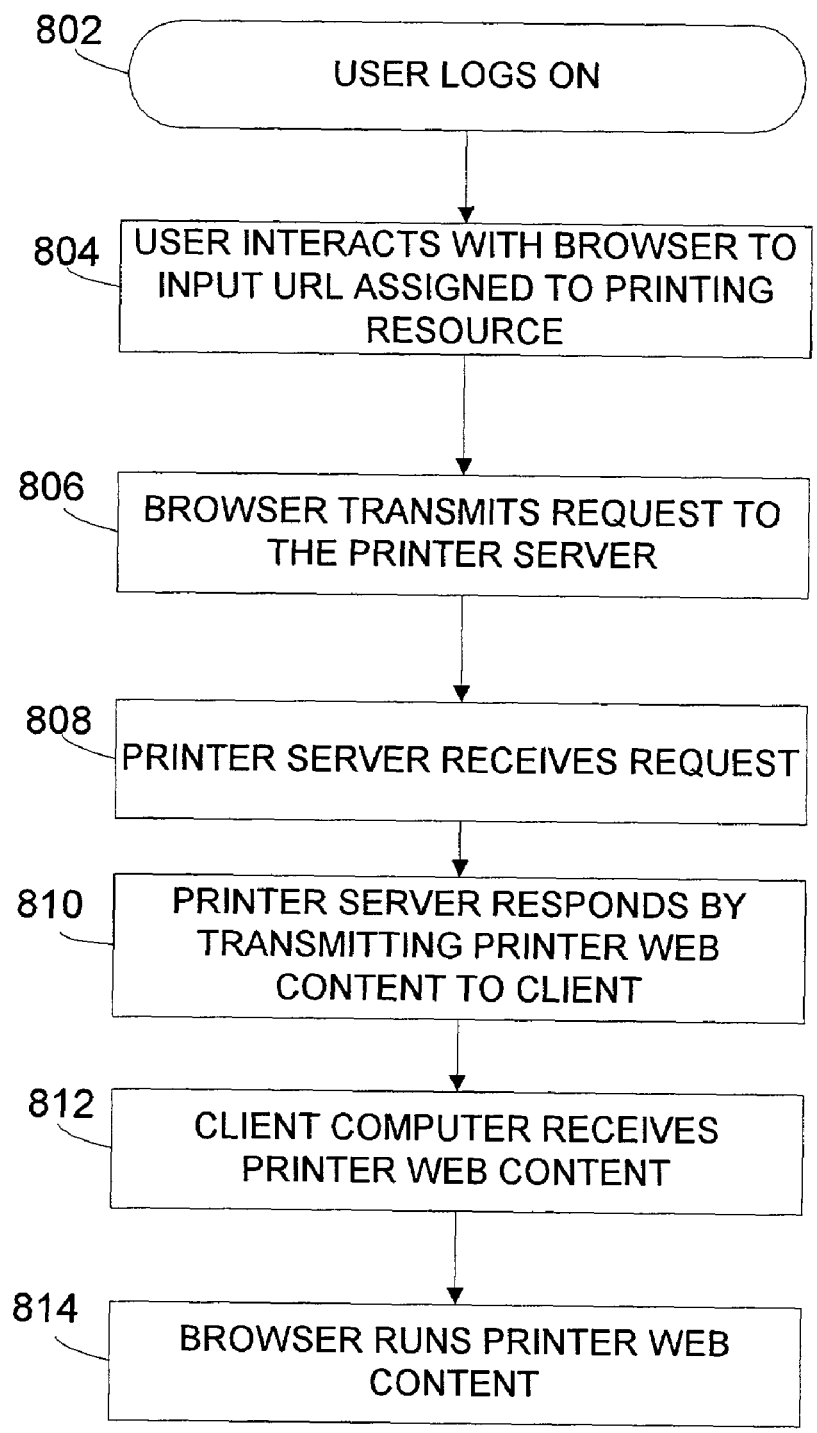
FIG. 8 and FIG. 9 are flow diagrams illustrating how a user can make use of a Web resource to print his/her target job document.
Figure 9:
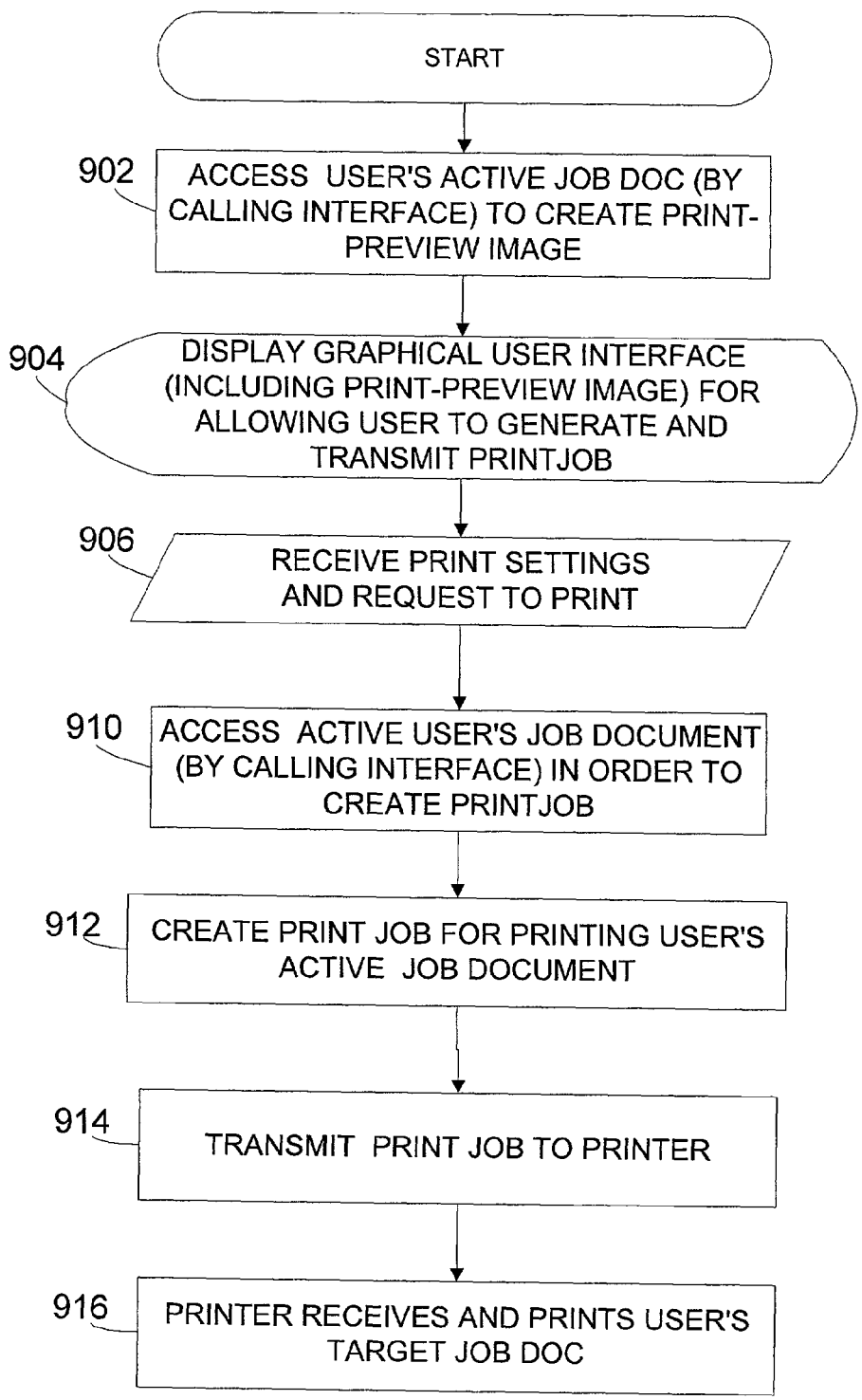

FIG. 8 and FIG. 9 are flow diagrams illustrating how the user 303 of the client computer 302, for example, can make use of the printer Web content 620 provided by the printer 602 in order to print his/her target job document.

Turning now to FIG. 8, the user 303 logs into the client computer 302 (step 802) and interacts with the browser 332 to request the printer Web content 620 (step 804). This can be accomplished by the user 303 inputting a pre-determined URL assigned to the printer Web content 620.

The Browser 332 responds by transmitting, over the network 110, an appropriate request to the printer's embedded Web server 618 (step 806). The Web server 618 receives the request and responds by transmitting the printer Web content 620 to the client computer 302 (step 808 and step 810).

The client computer 302 receives the printer Web content 620 (step 812). At step 814, the browser 332 runs the printer Web content 620.

FIG. 9 illustrates the operation of the Web content 620 at step 814. Turning now to FIG. 9, the printer Web content 620 accesses the user 303's target job document by issuing an appropriate call to the content interface 338 (step 902).

Next, the printer Web content 620 operates to display a graphical user interface (printer GUI) that allows the user to select various printing options that are offered by the printer 602 (step 904). In this embodiment, for example, the printer GUI includes a print-preview image of the user's target job document. The print-preview image is based upon the imaging information received at step 902.

Figure 10:
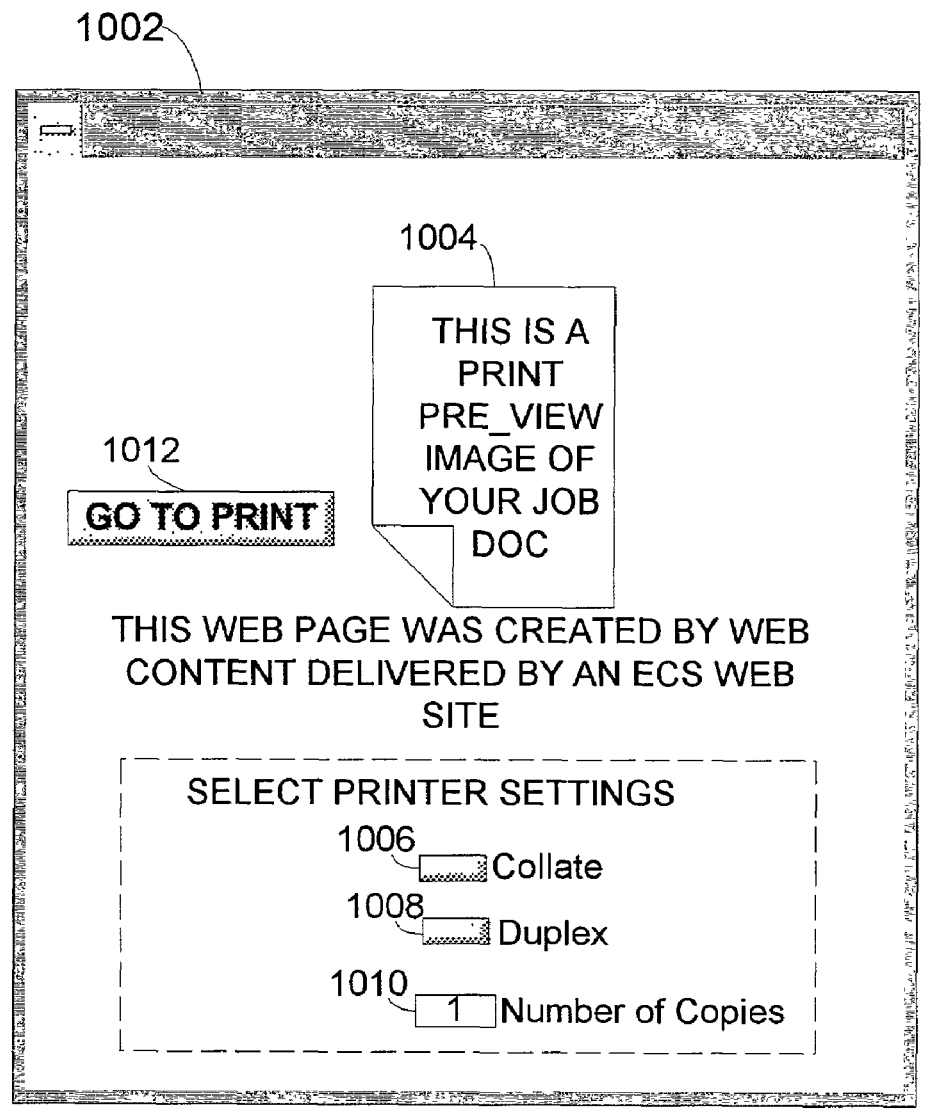
FIG. 10 provides an example of a printer GUI that may be displayed by Web content.
Figure 10:
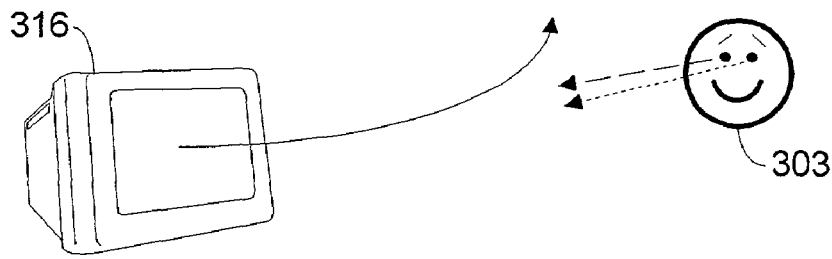

For illustration purposes, FIG. 10 provides an example of a printer GUI 1002 that may be displayed by the printer Web content 620 at step 904. In this example, the printer 106 offers document collation, duplex printing and multi-copy printing.

As shown, the printer GUI 1002 allows the user to select these options. For example, the printer GUI 1002 allows the user to select a document collation option 1006 and a duplex printing option 1008. In addition, the user can enter the number of copies he/she wishes to print by inputting the desired number in an input field 1010.

The GUI 1002 also includes a print preview image 1004. The print preview image 1004 provides a visual representation of how the user 303's target job document will be printed using the printer 602. The print preview image 1004 can be based upon the imaging information received at step 902 as well as the capabilities of the printer 602.

After the user has selected his/her desired print settings, the user can then request his/her target job document be printed by selecting the "go to print" button 1012.

Referring again to FIG. 9, the user interacts with the printer GUI displayed at step 904 in order to: a) select his/her desired print settings; and b) request his/her target job document be printed. The printer Web content 620 receives this user input at step 906.

In response to this user input, the printer Web content 620 accesses the user 303's target job document again by calling the content interface 338 (step 910). The Web content 620 uses the imaging information received at step 910 to create a print job (step 912). The print job is suitable to print the user 303's target job document according to the print settings received at step 906.

At step 912, the Web content 620 causes the print job to be transmitted to the printer 602 via the network 110. The printer 602 receives the print job and prints it, thereby generating a printed version of the user 303's target job document.

Web Portal Site

The range of job document creation and processing services that can be provided by ECS Web sites is limited only by human imagination. In the present embodiment, for example, the group of ECS Web sites 106 can provide many different types of job document creation and processing services. Vendors who hope that customers will make use of their particular Web service(s) have established some of these Web sites. In fact, some of these vendors charge users a fee for the use of their ECS resources.

A vendor, for example, may operate a printing business that includes an ECS Web site and an ECS printer. The vendor's ECS Web site provides an ECS resource(s) that represents the ECS printer and allows a customer to print his/her job documents by using the ECS printer. The vendor's ECS printer may, for example, be a high-end printer that can provide the customer with high quality bound copies of the customer's job documents. The vendor may also charge their customers a fee for the use of this printing service.

The number of Web sites that make up the group of Web Sites 106 can be large. This is not only due to the many types of ESC resources that can exist, but also due to the fact that these ESC resources can be offered over a ubiquitous communication system, the Public Internet. Thus, for example, the potential number of vendors who could establish an ECS Web site in the present embodiment can be extremely large. These vendors, in fact, can be located anywhere in the World.

From the foregoing, it can be seen that finding an ECS resource that is both available over the network 110 and that provides a particular service may present the user with a significant problem. For example, consider the scenario wherein the user wishes to find an ECS resource that can print his/her target job document using a high-end color capable printer. The user needs his/her printed document quickly and wishes to physically travel to the location where the printing will be performed in order obtain his/her documents as quickly as possible.

The user, under this scenario, may like to find an ECS resource that meets the following criteria:

a) the ECS resource is presently available over the network 110;

b) the ECS resource provides the desired printing service; and c) the ECS resource represents an ECS printer that is located close to the user.

As will be seen, the Web Portal site 108 can provide the user with a way to find an ECS resource that meets these criteria. Also, the Web Portal site 108 can provide a vendor with a way to advertise their respective ECS resources to potential customers.

Figure 11:
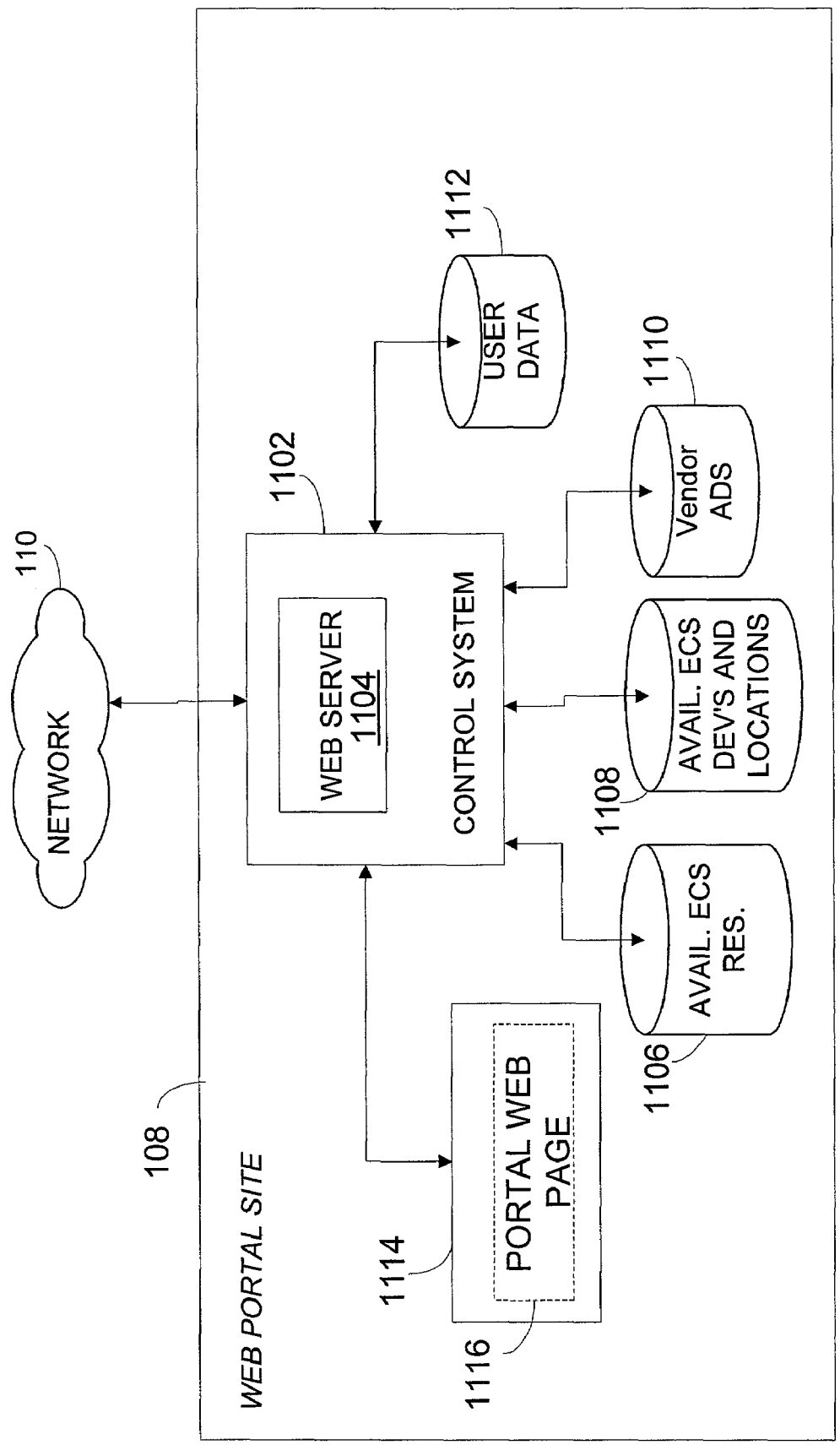
FIG. 11 illustrates the general architecture of a Web portal site.

FIG. 11 illustrates the general architecture of the Web portal site 108. As shown, the Web portal site 108 includes a control system 1102 that includes a Web Server 1104. The control system 1102 has access to various databases. These databases include an ECS resource database 1106; an ECS device database 1108; an advertisement database 1110 and a user database 1112. Additionally, the Web Portal Site 108 further includes a memory 1114 that stores a pre-defined Web page (portal Web page) 1116. In alternative embodiments, the Web Portal Site 108 may includes apparatus for generating such a Web page using server side scripting technologies such as, for example, ASP, ASP.NET, JAVA SERVLETS, JSP, CGI, ISAPI, or PHP.

The ECS resource database 1106 includes the URL information and other descriptive information of various ECS resources that are provided by various ECS Web sites from the group of Web sites 106.

The ECS device database 1108 includes a list and general descriptive information of various ECS devices that exist in the system 102. The descriptive information may include the physical location and features of the corresponding ECS device. The Web Portal site 108 allows a client user to browse these two databases.

The Advertisement database 1110, in this embodiment, includes a set of Web content modules. Each of these modules is for causing a browser to display a particular advertisement banner over the portal Web page 1116. The advertisement banner can be used to advertise a particular vendor's ECS resource.

It is noted that the databases just described may be populated using any one of a number of techniques. For example, the control system 1102 may operate to dynamically discover ECS resources and ECS devices (over the network 110) using any number of techniques. When the control system 1102 discovers an ECS resource or ECS device, an appropriate entry is placed in the appropriate database.

Additionally, a vendor (vendor "A") may run the Web portal Site 108. Other vendors (that run ECS Web sites of their own) may contract with vendor "A" in order to add their "advertisement modules" to the advertisement database 1110. Vendor "A" may charge these other vendors a fee for this advertisement service.

The user database 1112 includes information regarding prior browsing activities of users that have previously visited the Web portal site 108. In the present embodiment, when the user of a client computer first visits the Web portal site 108, the Web portal site 108 can place a cookie (describing a user ID) on the client computer's local memory. The cookie is returned each time the user re-visits the Web portal site 108 and allows the Web portal site 108 to track the user's database browsing activities. This information is stored in the user database under the user's ID described by the cookie.

Figure 12:
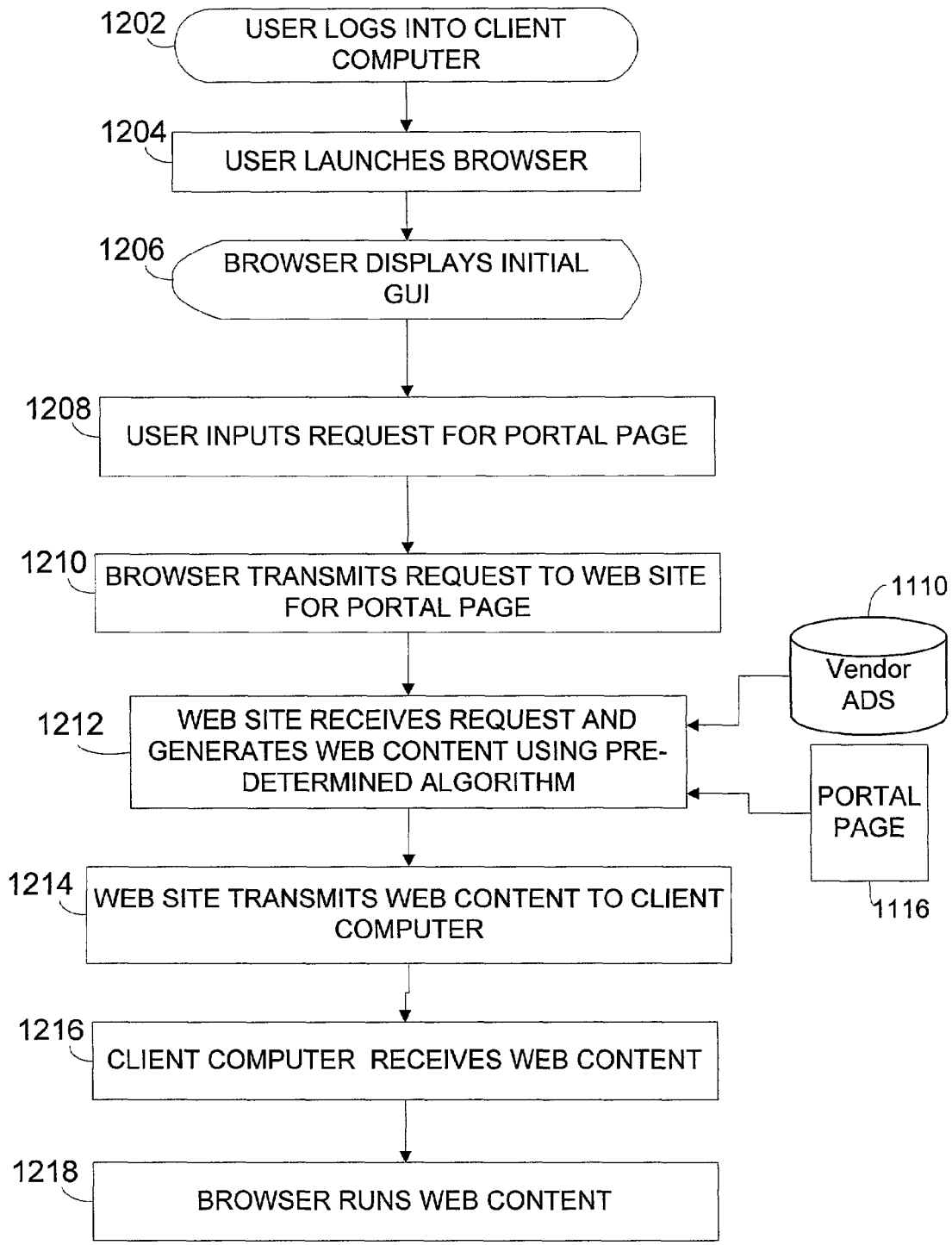
FIG. 12 illustrates how a user can make use of the Web portal site to obtain a Web portal page;oyotacar2

FIG. 12 illustrates an example of how the user 303, for example, can make use of the Web portal site 108 to obtain the Web portal page 1116. Referring now FIG. 12, the user 303 logs into the client computer 302 and launches the Web Browser 332 (step 1202 and step 1204). The Web Browser 332, upon being launched displays an initial Graphical User Interface (Browser GUI) (step 1206).

The user 303 then interacts with the Browser GUI in order to input a URL assigned to the Web Portal Page 1116 (step 1208). In response to this user input, the Browser 332 transmits an appropriate request to the Web portal site 108 (Step 1210).

The Web portal site 108 receives the request and responds thereto by following a pre-determined algorithm to generate Web content for transmission to the Web client computer 302. The algorithm, in this example, includes retrieving the pre-configured Portal Web page 1116 and selecting an advertisement module from the advertisement database (step 1210).

It is noted that the selection of the advertisement module may be based upon information regarding the user 303's prior behavior information that is stored in the user database 1112. For example, assume the user 303 has previously searched the ECS Web Site database 1106 for Web sites that offer ECS printing resources (i.e., ECS resources that represent printers). This prior browsing activity is stored in the user database 1112. Under this scenario, the advertisement module selected may be for an ECS resource that provides a printing service. Additionally, the Web portal site 108 may also access the user 303's target job document by transmitting Web content to the Browser 332. The Web content accesses the target job document (through the content interface 338) and transmits information regarding this document to the Web portal site 108. The Web portal site 108 can then use this information to select an advertisement module. For example, if the user's target job document comprises many pages, the Web portal site 108 may select an advertisement of an ECS resource that represents a high capacity printer.

Upon generating the Web content (which includes the Portal Web page 1116 and the advertisement module), the Web content is transmitted to the client computer 302 (step 1214). The client computer 302 receives the Web content (step 1216) and the browser 332 runs the Web content (step 1218).

Figure 13:
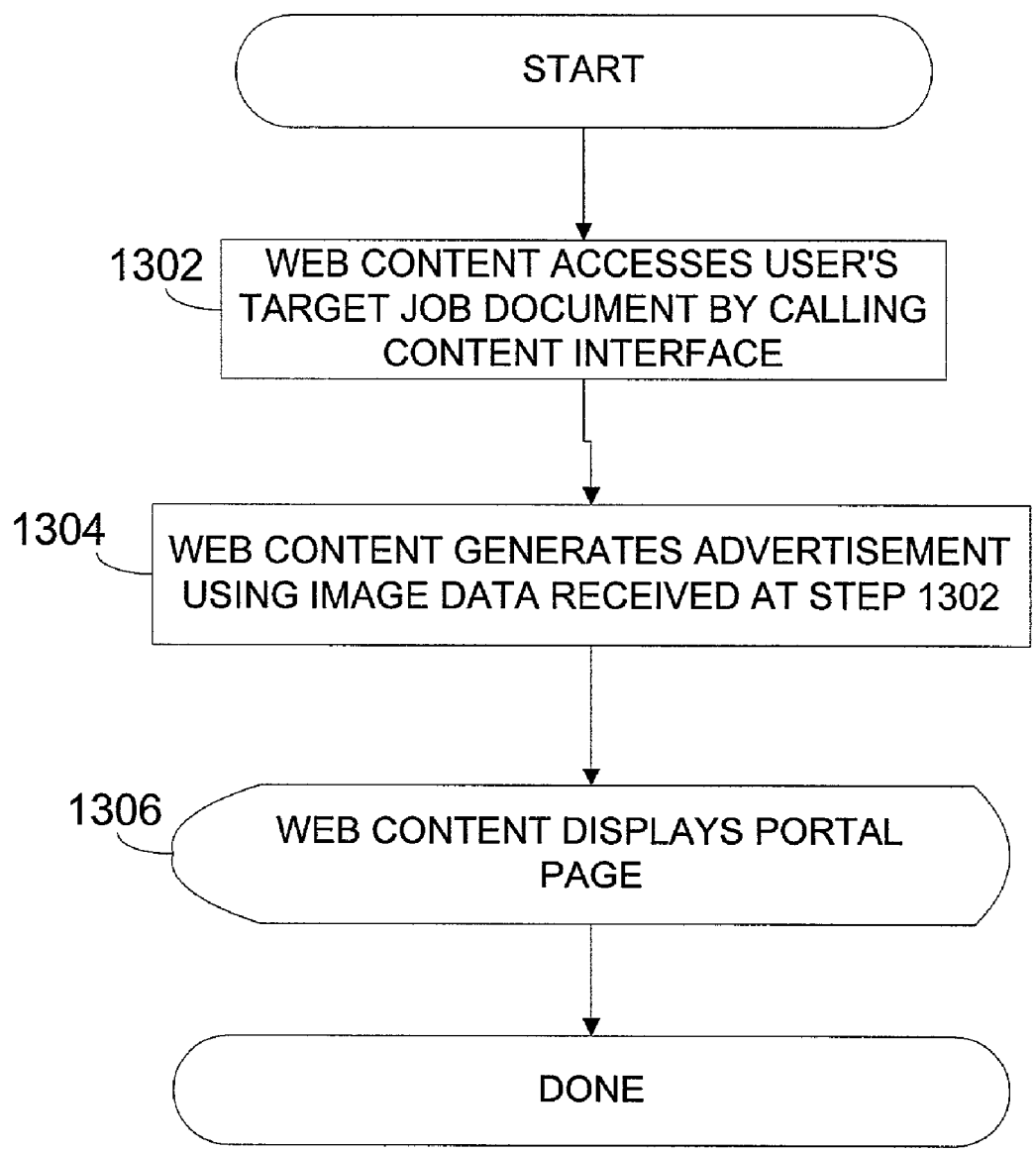
FIG. 13 illustrates how the Web content may operate to display the Web portal page.

FIG. 13 illustrates how the Web content may operate at step 1218 in the present embodiment. Turning now to FIG. 13, the advertisement module portion of the Web content operates to generate an advertisement by first calling the content interface 338 in order to access the user 303's target job document (step 1302). The Web content then makes use of this information to generate an advertisement banner that will be displayed over the portal Web page 1116 (step 1304). The Web content then proceeds to display the portal page 1116 along with the advertisement banner (step 1306).

Figure 14:
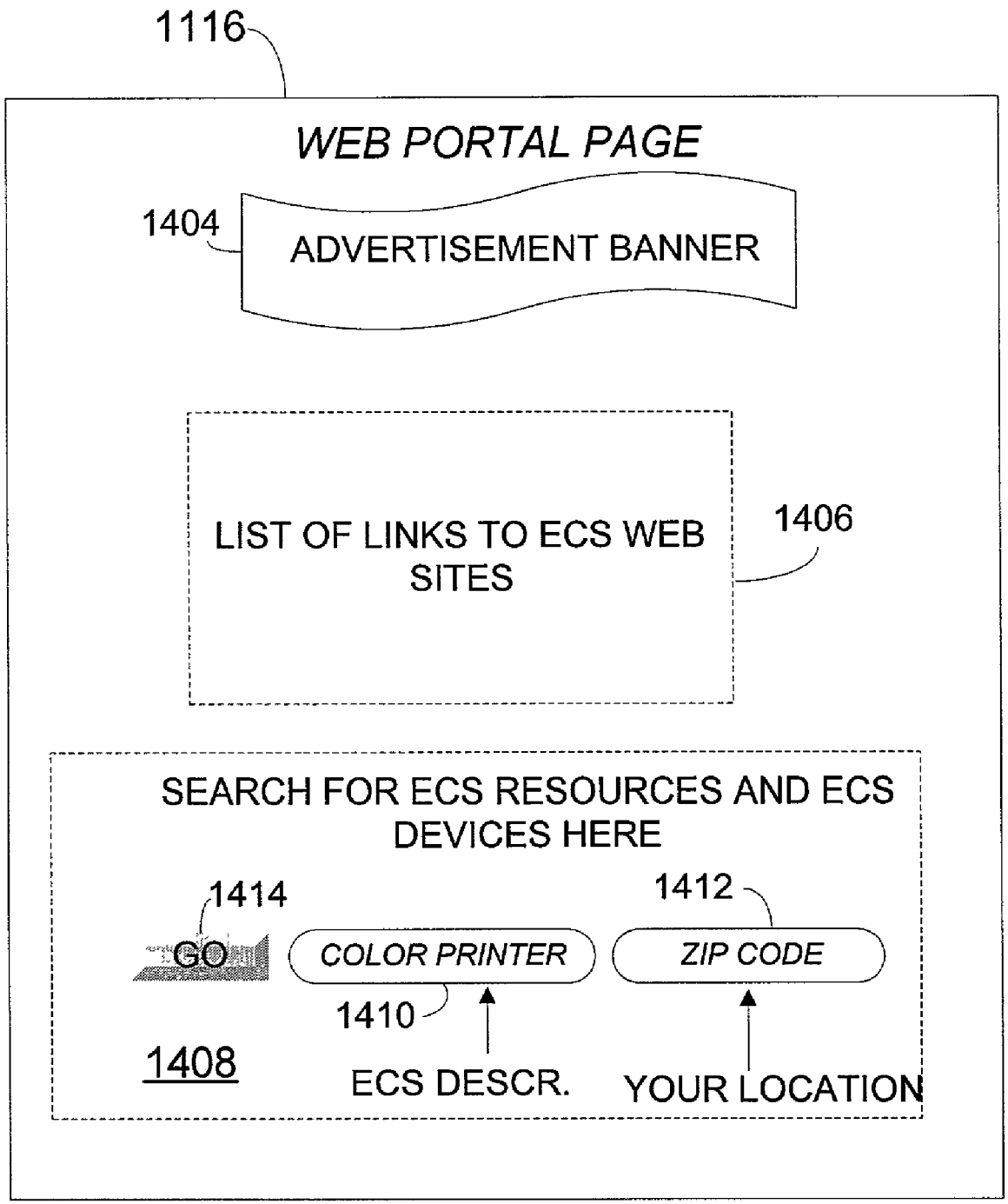
FIG. 14 provides an example of a Web portal page.

FIG. 14 provides an example of the pre-configured portal page 1116 and an advertisement banner 1404 that may be displayed at step 1306. As shown, the portal page 1116 includes a list of hyperlinks 1406. Each of the hyperlinks 1406 may point to an ECS resource or to a Web page that describes an ECS resource.

The Portal page 1116 may also include a section 1408 (as depicted) that allows the user to browse the ECS Web Site database 1106 and the ECS device database 1108. The user 303 can also input his/her present location in order to locate ECS devices that are in his/her area.

For example, the user 303 may enter the word "color printer" into the input field 1410 and his/her zip code into the input filed 1412. The user then can select the "GO" button 1414. This action causes the browser 332 to transmit an appropriate query to the portal site 108. The query includes the user-inputted information.

The Web portal site 108 responds to the query by searching the ECS resource database 1106 as well as the ECS device database 1108 for those ECS resources that meet the user's criteria. That is to say, the Web portal site 108 operates to identify one or more ECS resources that meet the following criteria:

a) the resource is presently available over the network 110;

b) the resource provides a color printing service; and c) the printing services makes use of a color capable printer that is located close to the user.

The results of the search is then transmitted back to the client computer 302 and displayed. The results may be displayed in the form of a Web page that includes links to the ECS resources that meet the user's criteria.

Figure 15:
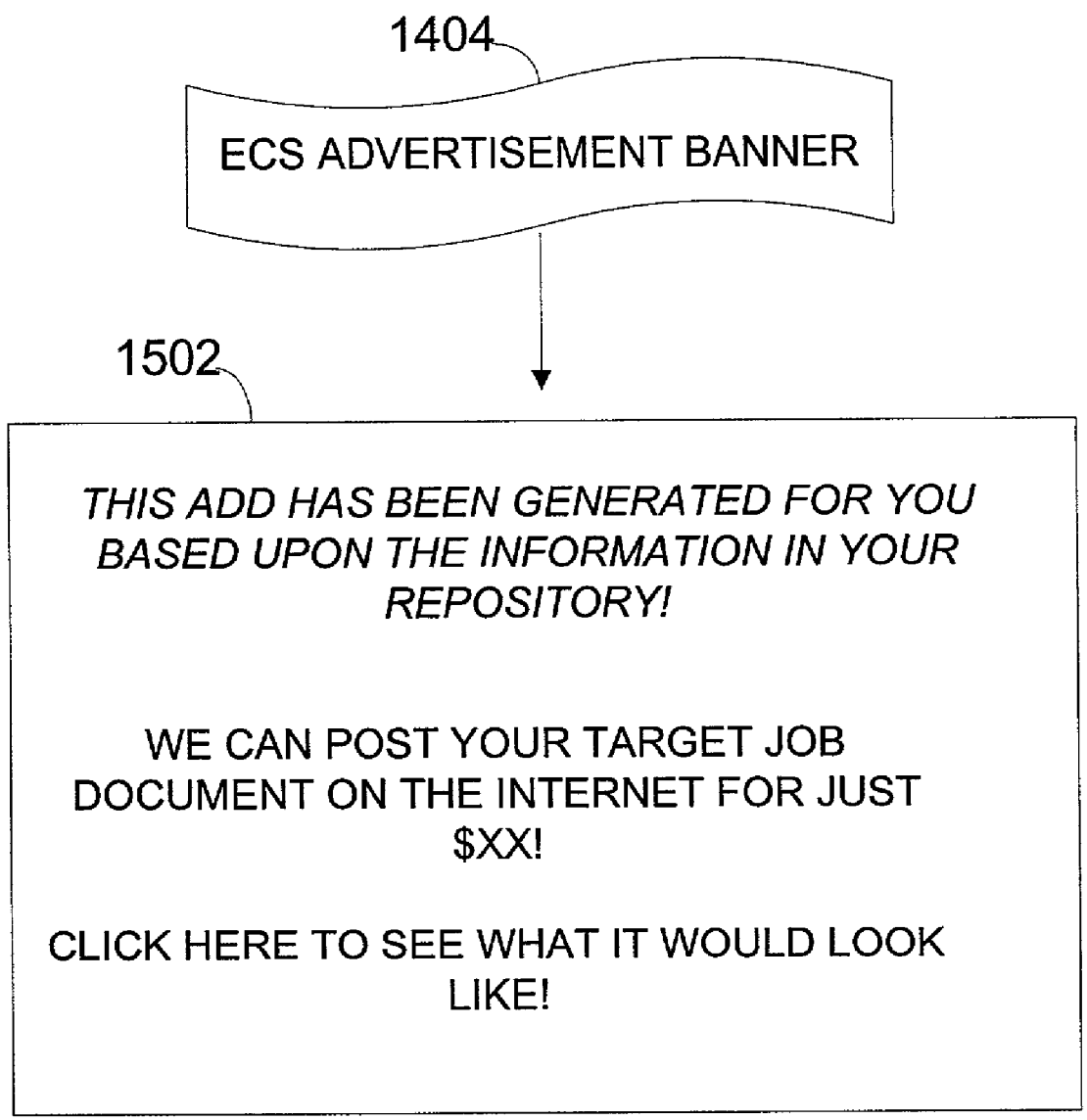
FIG. 15 shows in more detail an advertisement banner.

FIG. 15 shows in more detail the advertisement banner 1404. In this example, the advertisement banner 1404 describes an ECS resource that provides a Web document creation and hosting service.

It is noted that the cost to use this ECS resource is based upon the number of pages in the user 303's target job document. Also, as indicated, the user can click on the banner 1404. Clicking on the banner 1404 causes the Web content to convert the user's target job document into a Web page and to display the Web page locally on the client computer 302. In this manner, the advertisement banner 404 provides the user 303 with a personalized experience.

Thus, from this example, it can be seen that the Web Portal Site 108 can provide personalized advertisements that can be based on the user's prior browsing activities and/or the image data in the user's personal ECS repository.

It is noted that in other embodiments, additional information may be used to select an advertisement to display. For example, information regarding available ECS resources, and available ECS devices may also be used to select an advertisement to display. It is also noted that in other embodiments other aspects of the portal Web page may be generated dynamically based upon information regarding the user's prior browsing activities, the image data in the user's personal ECS repository, available ECS resources and ECS devices, or any combination thereof.

In the foregoing discussion, it can be seen that the Content interface 126 provides a client side interface that enables a Web resource (provided by a Web site) to access the user's pre-selected documents when the user is actively using the resource. In the example just discussed, the user's job document is identified based upon his/her online identity that exists on the client side.

It should be understood, however, that other types of common interfaces (including server side interfaces) may be used to provide this same or similar functionality. For example, a user's job documents may be linked to his/her online identity that exists on a server or to an online identity that exists across a network system.

In some embodiments, for example, a remote server (document server) is provided that allows a user to establish a server side online identity, which may be defined by a user identifier (document server ID). The document server may also provide the user with a personal repository for storing job documents.

In these embodiments, a Web server (service provider) that provides a Web resource can be configured to contact the document server in order to access the user's personal repository when the user is actively making use of the service. In order to enable this access, the user provides his/her document server ID to the service provider. The service provider can then make use of this information to interact with the document server in order to access the user's personal repository. It is noted that in some embodiments, a service (e.g.

MICROSOFT PASSPORT) provides the user's document server ID to the service provider.

Although several specific embodiments of the invention have been described and illustrated, the invention is not to be limited to specific forms or arrangements of parts so described and illustrated. For example, the printer Web server described above may be provided by a remote server that is not embedded in the printer. Also, the client computer may alternatively represent a personal digital assistant (PDA), workstation, etc. The invention is limited only by the claims and the equivalents thereof.

What is claimed is:

1. A system, comprising:
   a Web client computer coupled to a network and operable by a user having a personal repository for storing job documents;
   an interface for accessing the user's personal repository; and
   a Web site coupled to the network and operable to cause the client to display a portal Web page that includes a plurality of hyperlinks each pointing to a unique Web resource that is available over the network; and wherein each of the Web resources can make use of the same interface in order to access the user's personal repository.

2. The system of claim 1, wherein the Web site includes a browsable database of information regarding Web Resources that are available over the network and that can make use of the interface in order to access the user's personal repository.

3. The system of claim 1, wherein the Web site includes a browsable database of information regarding devices each respectively represented by a Web resource available over the network that can make use of the interface in order to access the user's personal repository.

4. The system of claim 1, wherein the Web page includes an advertisement of a Web resource that can make use of the interface to access the user's personal repository.

5. The system of claim 1, wherein the Web site generates the Web page based, at least in part, upon a job document stored in the user's personal repository.

6. The system of claim 1, wherein the interface resides on the Web client computer.

7. The system of claim 6, wherein the interface comprises an API.

8. A Web Server computer, comprising:
   means for receiving a request from a client computer over a network, where the client computer is operated by a user having a personal repository for storing job documents and the client computer includes an API for accessing the personal repository; and
   means for responding to the request by sending the client computer a portal Web page; and
   wherein the portal Web page includes a plurality of hyperlinks to a plurality of different Web sites, each Web site providing a Web resource configured to communicate with the API in order to access the user's personal repository.

9. The Web server computer of claim 8, wherein the Web page includes an advertisement of a particular Web resource configured to communicate with the API in order to access the user's personal repository.

10. The Web Server computer of claim 8, further comprising:
    a database including information regarding Web Sites available over the network each providing a resource configured to communicate with the API; and
    means for enabling a client computer to search the database.

11. The Web server computer of claim 10, wherein the database further includes information regarding devices that are represented by at least some of the Web resources.

12. The Web Server computer of claim 10, further comprising:
    means for dynamically discovering Web Sites connected to the network that provide a Web resource configured to communicate with the API; and
    means for adding information regarding the dynamically discovered Web Sites to the database.

13. The Web Server computer of claim 8, wherein the Web page includes an advertisement regarding a Web resource configured to access the user's personal repository through the API.

14. The Web server computer of claim 8, further comprising:
    means for generating the Web page based upon a characteristic of a job document stored in the user's personal repository.

15. A method, comprising:
    providing a server computer in communication with a network;
    the server computer receiving a request from a client computer over the network, where the client computer is operable by a user that has a personal repository for storing the user's job documents;
    the server computer responding to the request by transmitting a portal Web page to the client, the Web page including information regarding a plurality of different Web resources that are available over the network; and wherein each of the Web resources configured to make use of the same interface in order to access the personal repository when the user is actively making use of the resource.

16. The method of claim 15, wherein the Web page further includes an advertisement of a service provided by a resource configured to access the personal repository through the interface.

17. The method of claim 15, further comprising:
    providing a database associated with the server, the database including information regarding available Web Resources that are configured to make use of the interface in order to access a user's personal repository of job documents;
    the server computer receiving a query of the database from a client; and
    the server computer responding to the query by searching the database and sending the results of the query to the client.

18. The method of claim 15, wherein the interface resides on the client computer.

19. The method of claim 18, wherein the interface comprises an API.

20. A method, comprising:
    providing a client computer operable by a user having a personal repository for storing job documents, where the client computer includes a Web browser having a Web extension, the Web Extension providing an API for accessing the personal repository; and
    displaying a portal Web page on the client computer that includes a plurality of hyperlinks, each pointing to Web content that is specifically configured to communicate with the API in order to access the user's personal repository.

21. A method, comprising:

providing a client computer operable by a user having a personal repository for storing job documents and including an API for accessing the user's personal repository;

displaying a portal Web page on the client computer that includes a plurality of hyperlinks, each pointing to a Web resource that is configured to communicate with the API in order to access the user personal repository.

* * * * *